March 21, 1961 A. L. PIZZI 2,975,921
ARTICLE EJECTING FIXTURE
Filed Feb. 9, 1959 2 Sheets-Sheet 2
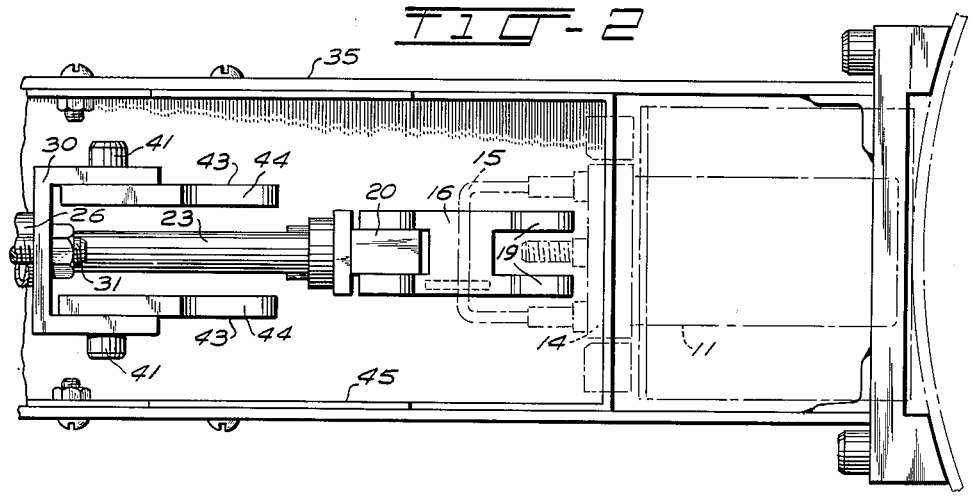
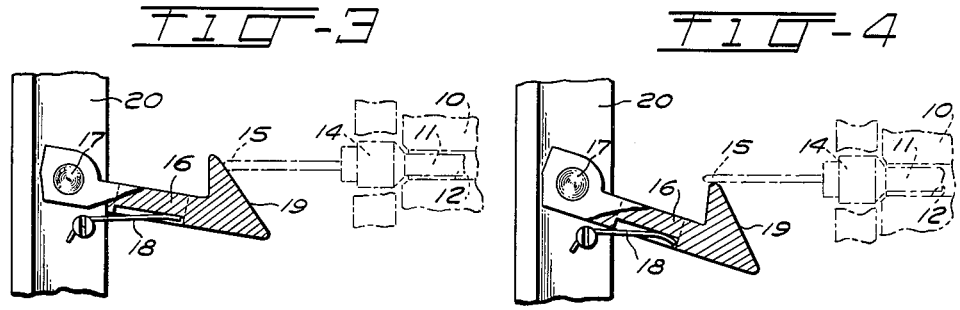
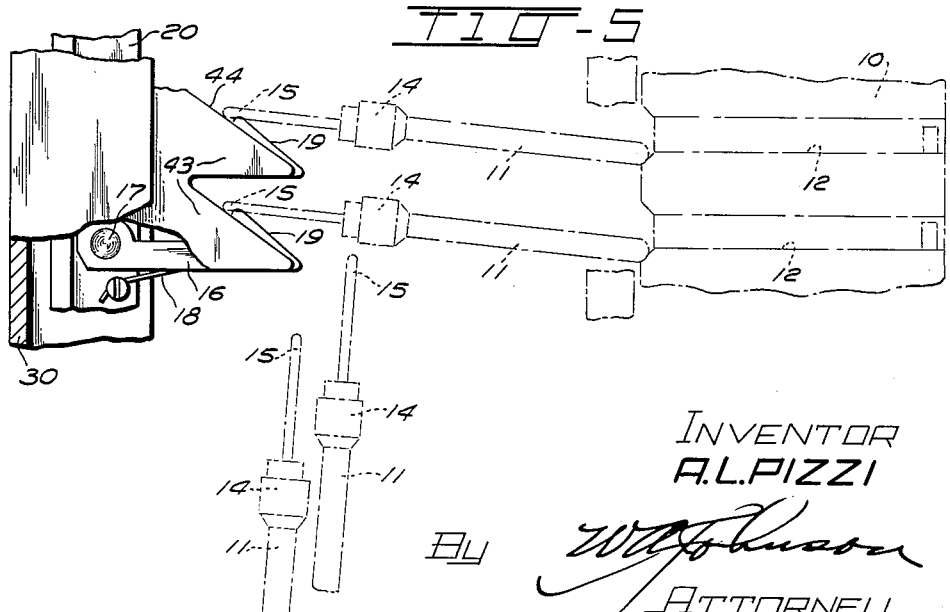
INVENTOR
A.L.PIZZI
BY
ATTORNEY United States Patent Office 2,975,921
Patented Mar. 21, 1961

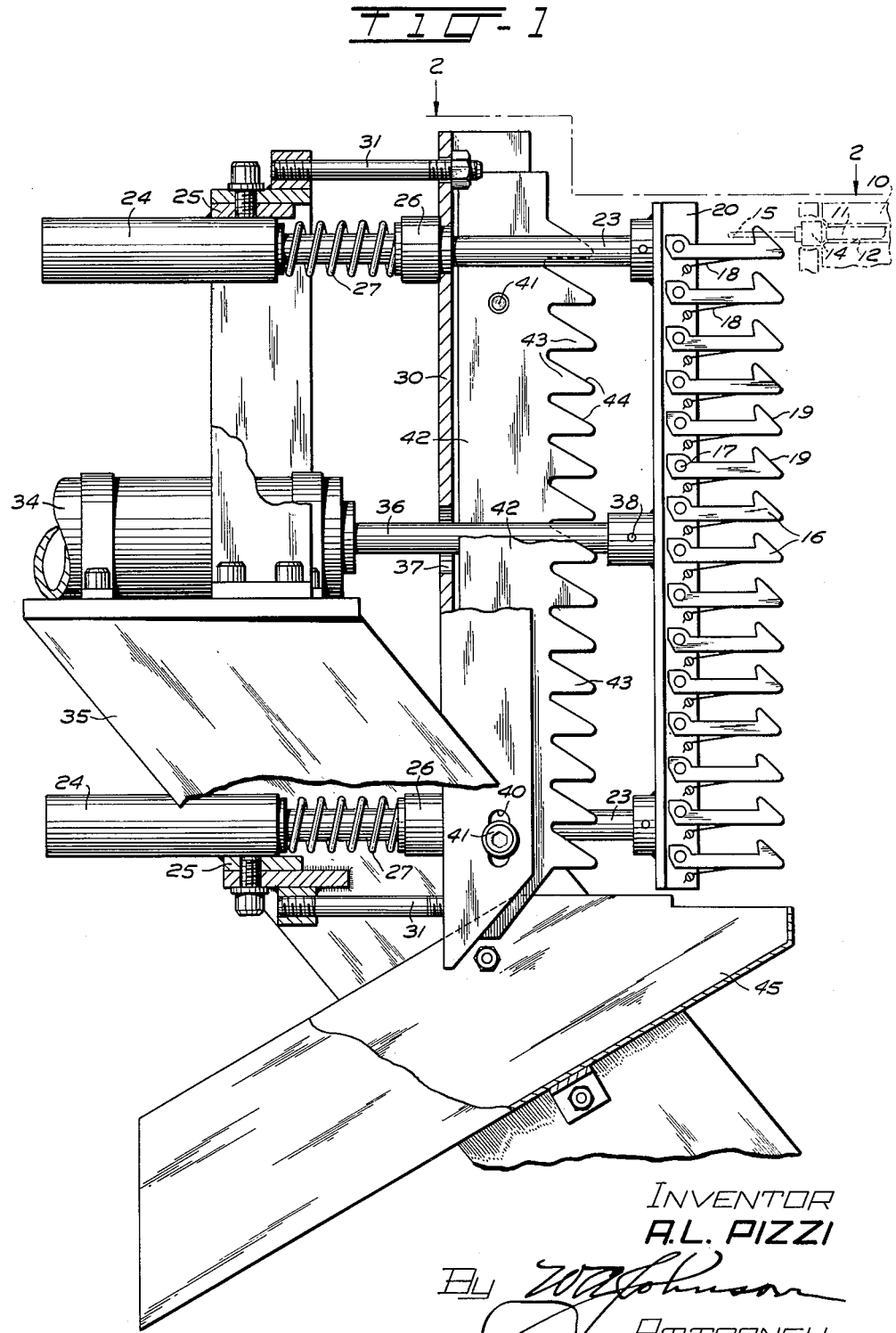

2,975,921

ARTICLE EJECTING FIXTURE

Albert L. Pizzi, Union, N.J., assignor to Western Electric Company, Incorporated, New York, N.Y., a corporation of New York Filed Feb. 9, 1959, Ser. No. 792,024

3 Claims. (Cl. 214—309)

This invention relates to apparatus for removing articles from holders, particularly articles having engageable projections from pockets of processing units.

In the manufacture of certain types of electrical components, it is necessary that they be placed in processing treating units and subsequently removed therefrom. One example is flat type resistors, wherein the cores and the windings on the cores are provided with one or more coverings of dielectric material. These resistors or articles initially are provided with projections used in placing the articles in pockets of the processing unit where the articles are heated and compressed. The processing units are adapted to receive numerous articles for treatment simultaneously and the daily output of the units depends largely on the speed with which the articles may be fed thereto and removed therefrom. The processing unit and the means for feeding the articles thereto are disclosed in the co-pending application of J. M. Kamins and F. Wahl, Serial No. 659,101, filed May 14, 1956, now Patent No. 2,896,801.

An object of the present invention is an efficient apparatus for removing articles from holders.

In accordance with the object, the invention includes an apparatus for removing articles, having catch engageable projections, from holders therefor, the apparatus having a catch mounted on a support movable between engaging and disengaging positions so that the catch will engage the projection of an article and remove the article from the holder. Additional means mounted at the disengaging position moves the projection free of the catch. More specifically, the support has a plurality of aligned catches in the form of spring pressed latches aligned with articles to engage the projections of their articles simultaneously and remove the articles from their holders. A comb having teeth with tapered surfaces adjustably mounted with respect to the catches caused the projections to be moved free of the catches after the articles are moved free of their holders.

Other objects and advantages will be apparent from the following description when considered in conjunction with the accompanying drawings, wherein:

Fig. 1 is a side elevational view of the apparatus mounted adjacent holders for articles;

Fig. 2 is a fragmentary top plane view taken along the line 2—2 of Fig. 1;

Figs. 3 and 4 are fragmentary detailed views of one of the catches illustrating the actions thereof when moving into engagement with the projection of an article, and Fig. 5 is a fragmentary detailed view of a portion of the apparatus illustrating movement of the projections of articles free of the catches following movement of the articles from their holders.

The apparatus as shown in Fig. 1 is mounted adjacent a plurality of holders 10 for articles 11. In the present instance the holders 10 are portions of a processing unit shown in the aforementioned co-pending application.

Actually in this illustration the holders are in the form of pockets 12 for receiving the main body of each article 11 which in the present instance is a flat type resistor wherein the main core and the resistance windings are covered with dielectric materials. A head 14 of each article 11 has a U-shaped projection 15, the central portion of which will be removed subsequently to produce spaced terminals. However, the U-shaped portion or projection is utilized in removing the articles 11 from their holders.

A plurality of catches 16 identical in structure are pivotally mounted at 17 in vertical alignment but spaced from each other according to the vertical spacing of the articles 11 in their pockets 12. Individual springs 18 for the catches hold the catches normally in the position shown but permit downward movement of the catches about their pivots during movement of the catches into their engaging positions as illustrated in Figs. 3 and 4. Tapered ends 19 of the catches 16 engage their projections 15 and move against the forces of their springs until they pass beyond the central portion of the projections and are free to enter or move upwardly to engage the projections. The catches 16 are H-shaped in general contour, meaning that the left ends of the catches are bifurcated to straddle a vertical support 20 and the free ends are bifurcated mainly to provide spaced engaging portions cooperating with the lateral or central portions of the projections 15 to assure straight line movement of the articles free of the pockets 12.

The support 20 is mounted near the upper and lower ends thereof on guide rods 23 which are supported in sleeve-like bearings 24 mounted on a frame 25. Collars 26 are secured to the rods 23 and are normally urged to the right by springs 27 disposed concentric with the rods and engaging the adjacent ends of the bearings 24 to urge the support 20 with the catches 16 into the engaging position. A stationary vertical support 30 connected adjustably to the main frame 25 by elements 31 is apertured for the rods 23 and serves as an abutment for the collars 26, limiting movement of the latches toward their engaging position.

Means to move the support 20 with the catches 16, in addition to the springs 27, includes an air cylinder 34 mounted on a portion 35 of the main frame and having a piston rod 36 extending through an aperture 37 of the vertical support 30 and connected at 38 to the support 20. The air cylinder 34 may be operated in any suitable manner such as through the aid of a control valve in a fluid line leading from a supply not shown of fluid under pressure. The vertical support 30 is U-shaped in cross-section and has spaced pairs of elongate apertures 40 in the side portions thereof to receive mounting screws 41 disposed in threaded apertures of like parallel combs 42. The combs 42 have teeth 43 equal in number to the catches 16 and with tapered surfaces 44 located at the disengaging position to remove the projections of the articles from the catches and free the articles to drop down a chute 45 which will direct them into a receptacle not shown.

Operation

Let it be assumed that articles 11 are disposed on their holders or in the pockets 12 of the unit 10. The apparatus may be of a portable type mounted for movement into position relative to the unit 10, or the apparatus may be fixedly mounted adjacent units 10 of the movable or turret type. In the latter, the articles may be loaded in the units at one station and the apparatus may unload the articles from the unit at another station. The apparatus is operated through action of the air cylinder in one direction, assisted by the springs 27, to move the support 20 with the catches 16 into the engaging position. During this movement the catches will be moved about their pivot 17 against the forces of their springs 18 as illustrated in Figs. 3 and 4 until the catches reach the positions shown in Figs. 1 and 2. The springs 18 return the catches to their top or normal positions after which the air cylinder may be operated to move the catches to the disengaging positions which they are approaching as illustrated in Fig. 5. In this figure it is illustrated that the articles have been moved free of their holders or pockets 12 and are about to swing downwardly. A short additional movement of the support 20 to the left with the catches will complete the upward movement of the projections 15 along the tapered surfaces 44 of the teeth of the combs to move the projections free of the catches shortly after freeing the articles from their holders or pockets to assure dropping of the articles with the projections 15 uppermost to eliminate damage to the projections as the articles fall downwardly to the chute 45 where they are guided to a receptacle. The spaced parallel catch portions engaging spaced portions of the projection 15 in each instance assure straight line movement of each article out of its pocket 12 and in the same manner the spaced parallel combs engaging portions of the projections outside of the catches assure uniform movement of the projections upwardly free of their catches, eliminate any lateral action of the articles and assure straight dropping of the articles with their projections uppermost toward the chute.

It is to be understood that the above described arrangements are simply illustrative of the application of the principles of the invention. Numerous other arrangements may be readily devised by those skilled in the art which will embody the principles of the invention and fall within the spirit and scope thereof.

What is claimed is:

1. An apparatus for removing articles, having apertured projections, from aligned pockets of a unit from which the apertured projections are engageable, comprising a support, aligned hook-shaped catches, means to mount the hook-shaped catches for relative movement on the support in alignment with their respective pockets, means to move the support in one direction to move the hook-shaped catches into the apertures of the projections simultaneously and to move the support in a reverse direction to cause the hook-shaped catches to remove the articles simultaneously from the pockets, a comb having teeth with tapered surfaces, and means to mount the comb at a fixed position relative to the support so that the tapered surfaces of the teeth thereof will engage the projections and cause them to move free of the hook-shaped catches.

2. An apparatus for removing articles, having U-shaped latch engaging projections, from aligned pockets of a unit from which the projections are engageable, comprising a support, aligned latches pivotally mounted on the support in alignment with their respective pockets, the latches being spring pressed into normal positions and each having spaced parallel portions with tapered ends for actuation into engaging position by its U-shaped projection, means to move the support in one direction to move the latches into engagement with the U-shaped projections simultaneously and to move the support in a reverse direction to remove the articles simultaneously from the pockets, and a comb having teeth with tapered surfaces to engage the projections and cause them to move free of the latches.

3. An apparatus for removing articles, having U-shaped catch engaging projections, from aligned pockets of a unit from which the projections are engageable, comprising a support, aligned catches, in the form of pivotal latches spring pressed into normal positions and each having spaced parallel portions with tapered ends for actuation into engaging position by its U-shaped projection, mounted on the support in alignment with their respective pockets, means to move the support in one direction to move the catches into engagement with the projections simultaneously and to move the support in a reverse direction to remove the articles simultaneously from the pockets, two like parallel combs, and means adjustably supporting the combs to be engaged by the projections on each side of each catch to move the projections from the catches subsequent to the removal of the articles from the pockets to free the articles simultaneously.

References Cited in the file of this patent

UNITED STATES PATENTS

| | | |
|---|---|---|
| 2,578,912 | Waters | Dec. 18, 1951 |
| 2,757,812 | Kughler | Aug. 7, 1956 |